(12) United States Patent
Lai et al.

(10) Patent No.: US 11,641,465 B2
(45) Date of Patent: May 2, 2023

(54) METHOD AND APPARATUS OF CROSS-COMPONENT ADAPTIVE LOOP FILTERING WITH VIRTUAL BOUNDARY FOR VIDEO CODING

(71) Applicant: HFI INNOVATION INC., Zhubei (TW)

(72) Inventors: Chen-Yen Lai, Hsinchu (TW); Ching-Yeh Chen, Hsinchu (TW); Tzu-Der Chuang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/620,972

(22) PCT Filed: Jul. 22, 2020

(86) PCT No.: PCT/CN2020/103523
§ 371 (c)(1),
(2) Date: Dec. 20, 2021

(87) PCT Pub. No.: WO2021/013178
PCT Pub. Date: Jan. 28, 2021

(65) Prior Publication Data
US 2022/0272332 A1    Aug. 25, 2022

Related U.S. Application Data

(60) Provisional application No. 62/878,379, filed on Jul. 25, 2019.

(51) Int. Cl.
*H04N 19/117* (2014.01)
*H04N 19/132* (2014.01)
*H04N 19/186* (2014.01)
*H04N 19/82* (2014.01)

(52) U.S. Cl.
CPC ......... *H04N 19/117* (2014.11); *H04N 19/132* (2014.11); *H04N 19/186* (2014.11); *H04N 19/82* (2014.11)

(58) Field of Classification Search
CPC .... H04N 19/82; H04N 19/117; H04N 19/132; H04N 19/186
See application file for complete search history.

(56) References Cited

U.S. PATENT DOCUMENTS

| 2013/0322523 A1* | 12/2013 | Huang | ................. H04N 19/134 |
| | | | 375/240.02 |
| 2016/0241880 A1* | 8/2016 | Chao | ...................... H04N 19/86 |

(Continued)

FOREIGN PATENT DOCUMENTS

| WO | 2012/152174 A1 | 11/2012 |
| WO | 2015/057677 A1 | 4/2015 |
| WO | 2018/182377 A1 | 10/2018 |

OTHER PUBLICATIONS

International Search Report and Written Opinion dated Oct. 28, 2020, issued in application No. PCT/CN2020/103523.

(Continued)

*Primary Examiner* — Dave Czekaj
*Assistant Examiner* — Shanika M Brumfield
(74) *Attorney, Agent, or Firm* — McClure, Qualey & Rodack, LLP

(57) ABSTRACT

Methods and apparatus for loop-filter processing of reconstructed video are disclosed. According to this method, if a loop-filter is disallowed for a target boundary, the target loop filter is disabled at top, bottom, left and right of the target boundary. According to another method, CC-ALF (cross-component adaptive loop filter) shape is changed across a virtual boundary. According to yet another method, CC-ALF and luma ALF handle unavailable samples in a same way.

9 Claims, 9 Drawing Sheets

(56) References Cited

U.S. PATENT DOCUMENTS

| | | | |
|---|---|---|---|
| 2016/0241881 A1* | 8/2016 | Chao | H04N 19/182 |
| 2018/0054613 A1 | 2/2018 | Lin et al. | |
| 2018/0063527 A1* | 3/2018 | Chen | H04N 19/117 |
| 2021/0014537 A1* | 1/2021 | Hu | H04N 19/174 |
| 2022/0103817 A1* | 3/2022 | Zhang | H04N 19/167 |
| 2022/0116596 A1* | 4/2022 | Zhang | H04N 19/80 |
| 2022/0132114 A1* | 4/2022 | Paluri | H04N 19/186 |
| 2022/0132117 A1* | 4/2022 | Zhang | H04N 19/176 |
| 2022/0141461 A1* | 5/2022 | Zhang | H04N 19/174 |
| | | | 375/240.29 |

OTHER PUBLICATIONS

Misra, K., et al.; "Cross-Component Adaptive Loop Filter for chroma;" Joint Video Experts Team (JVET) of ITU-T SG 16 WP 3 and ISO/IEC JTC 1/SC 29/WG 11; Jul. 2019; pp. 1-9.

Kotra, A. M. et al.; "CE5-2: Loop filter line buffer reduction;" Joint Video Experts Team (JVET) of ITU-T SG 16 WP 3 and ISO/IEC JTC 1/SC 29/WG 11; Mar. 2019; pp. 1-9.

Wang, Y.K., et al.; "AHG12: On turning off ALF filtering at brick and slice boundaries;" Joint Video Experts Team (JVET) of ITU-T SG 16 WP 3 and ISO/IEC JTC 1/SC 29/WG 11; Jul. 2019; pp. 1-2.

Liu, H., et al.; "Non-CE5: Padding method for samples at variant boundaries in ALF;" Joint Video Experts Team (JVET) of ITU-T SG 16 WP 3 and ISO/IEC JTC 1/SC 29/WG 11; Jul. 2019; pp. 1-4.

Chinese language office action dated Sep. 8, 2021, issued in application No. TW 109124913.

Extended European Search Report dated Feb. 14, 2023, issued in application No. EP 20842930.8.

Esenlik, S. et al., "AHG6: Modification to loop filtering across slice boundaries;" Joint Collaborative Team on Video Coding (JCT-CV) of ITU-T SG16 WP3 and ISO/IEC JTC1/SC29/WG11; Jul. 2012, pp. 1-8.

Wang, Y., et al.; "Non-CE5: On CC-ALF padding for ALF virtual boundaries;" Jpint Video Experts Team (JVET) of ITU-T SG 16 WP 3 and ISO/IEC JTC 1/SC 29/WG 11; Jan. 2020; pp. 1-6.

* cited by examiner $c2' = c2 + c0$ $c5' = c5 + c1 + c3$
$c6' = c6 + 2*c2 + 2*c0$

METHOD AND APPARATUS OF CROSS-COMPONENT ADAPTIVE LOOP FILTERING WITH VIRTUAL BOUNDARY FOR VIDEO CODING

CROSS REFERENCE TO RELATED APPLICATIONS

The present invention claims priority to U.S. Provisional Patent Application, Ser. No. 62/878,379, filed Jul. 25, 2019. The U.S. Provisional Patent Application is hereby incorporated by reference in its entirety.

FIELD OF THE INVENTION

The present invention relates to adaptive loop filter (ALF) processing in a video coding system. In particular, the present invention relates to Cross-Component ALF processing with virtual boundary in a video encoder or decoder.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artefacts are introduced, particularly in the quantization process. In order to alleviate the coding artefacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive Inter/Intra video coding system incorporating in-loop processing including adaptive loop filter (ALF). For Inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In video coding systems, various in-loop filters such as Deblocking Filter (DF) 130, Sample Adaptive Offset (SAO) 131 and Adaptive Loop Filter (ALF) 132 have been used to enhance picture quality.

A corresponding decoder for the encoder of FIG. 1A is shown in FIG. 1B. The video bitstream is decoded by Entropy Decoder 142 to recover the transformed and quantized residues. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

Cross-Component ALF Processing

In JVET-O0636 (Kiran Misra, et al., "Cross-Component Adaptive Loop Filter for chroma", Joint Video Experts Team (JVET) of ITU-T SG 16 WP 3 and ISO/IEC JTC 1/SC 29/WG 11, 15th Meeting: Gothenburg, SE, 3-12 Jul. 2019, Document: JVET-O0636), Cross-Component Adaptive Loop Filter (CC-ALF) is proposed. CC-ALF makes use of luma sample values to refine each chroma component. FIG. 2A illustrates the structure of CC-ALF with respect to the other loop filters according to JVET-O0636. In FIG. 2A, the ALF processing is performed after respective SAO (210, 212 and 214). In a conventional video coding system, only ALF Luma 220 and ALF Chroma 230 are used. In JVET-O0636, two additional ALF filters, i.e., CC ALF Cb 222 and CC ALF Cr 224 are used to derive adjustment signals to add to ALF processed Cb and Cr using adders 240 and 242 respectively.

In CC-ALF operates by applying a linear, diamond shaped filter to the luma channel for each chroma component as shown in FIG. 2B according to JVET-O0636. The filter coefficients are transmitted in the APS, scaled by a factor of $2^{10}$, and rounded for fixed point representation. The application of the filters is controlled on a variable block size and signalled by a context-coded flag received for each block of samples. The block size along with a CC-ALF enabling flag is received at the slice-level for each chroma component. Syntax and semantics for CC-ALF are also disclosed in JVET-O0636.

Virtual Boundaries to Reduce Line Buffer Usage

In order to eliminate the line buffer requirements of SAO and ALF, we introduce the concept of virtual boundary (VB). As shown in FIG. 3, VBs are upward shifted horizontal largest coding unit (LCU) boundaries by N pixels. For each LCU, SAO and ALF can process pixels above the VB before the lower LCU comes but cannot process pixels below the VB until the lower LCU comes, which is caused by DF. With consideration of the DF in HM-4.0, the space between the proposed VB and the horizontal LCU boundary is set as three pixels for luma (i.e. N=3 in FIG. 3) and one pixel for chroma (i.e. N=1 in FIG. 3). SAO and ALF are modified to ensure that every to-be-processed pixel on one side of a VB does not require any data access from the other side of the VB unless the data can become available in time without using any additional line buffer.

In JVET 11-th meeting, ALF with 4×4 block-based adaptation is adopted in the draft of the next generation video coding standard, Versatile Video Coding (VVC). For one 4×4 block, one 8×8 window is required to calculate the block property and the filter footprint is one 7×7 diamond filter for luma and one 5×5 diamond filter for chroma. Therefore, the required line buffer without virtual boundaries is additional 7 luma line buffer and 3 chroma line buffer on top of 4 luma DF line buffer and 2 chroma DF line buffer. The concept of virtual boundaries can still be applied in VVC to reduce the line buffer usage. In the above description, largest coding unit (LCU) is renamed as coding tree unit (CTU) in VVC. However, some modifications are proposed to fit the features of current ALF design.

Non-Linear ALF Operations

In VTM3.0 (VVC (Versatile Video Coding) Test Model Ver. 3.0), the filtering process of the Adaptive Loop Filter, is performed as follows:

$$O(x,y)=\Sigma_{(i,j)}w(i,j)\cdot I(x+i,y+j), \quad (1)$$

In the above equation, samples I(x+i, y+j) are input samples, O(x,y) is the filtered output sample (i.e. filter result), and w(i,j) denotes the filter coefficients. Since the ALF is applied to the reconstructed samples, samples I(x+i,y+j) correspond to reconstructed samples. The center reconstructed pixel at a center location of the ALF processing corresponds to (i,j)=(0, 0), i.e., I(i,j). In practice, in VTM3.0, it is implemented using integer arithmetic for fixed point precision computations:

$$O(x, y) = \left(\Sigma_{i=-\frac{L}{2}}^{\frac{L}{2}}\Sigma_{j=-\frac{L}{2}}^{\frac{L}{2}}w(i, j)\cdot I(x+i, y+j)+64\right) \gg 7, \quad (2)$$

In the above equation, L denotes the filter length, and where w(i,j) are the filter coefficients in fixed point precision.

Equation (1) can be reformulated, without coding efficiency impact, in the following expression:

$$O(x,y)=I(x,y)+\Sigma_{(i,j)\neq(0,0)}w(i,j)\cdot(I(x+i,y+j)-I(x,y)), \quad (3)$$

In the above equation, w(i,j) are the same filter coefficients as in equation (1) except for w(0, 0), which is equal to 1 in equation (3) while it is equal to $(1-\Sigma_{(i,j)\neq(0,0)}w(i,j))$ in equation (1).

Using the above filter formula of equation (3), we can easily introduce nonlinearity to make ALF more efficient by using a simple clipping function to reduce the impact of neighbor sample values (I(x+i, y+j)) when they are very different from the current sample value (I(x,y)) being filtered.

In JVET-M0385 ((J. Taquet, et al., "*Non-Linear Adaptive Loop Filter*", in Joint Video Exploration Team (JVET) of ITU-T SG 16 WP 3 and ISO/IEC JTC 1/SC 29/WG 11, 13th Meeting: Marrakech, Mass., 9-18 Jan. 2019, Document: JVET-M0385)), a non-linear ALF is disclosed. It introduces an adaptive clipping operation on the input samples values of the Adaptive Loop Filter in test software VTM3.0. The goal of this adaptive clipping is to introduce some non-linearities to limit the difference between the input sample value to be filtered and the other neighbor input sample values of the filter.

According to JVET-M0385, the ALF filter operation is modified as follows:

$$O'(x,y)=I(x,y)+\Sigma_{(i,j)\neq(0,0)}w(i,j)\cdot K(I(x+i,y+j)-I(x,y), k(i,j)), \quad (4)$$

In the above equation, O'(x,y) corresponds to the modified ALF filter output, I(x,y) corresponds to sample before ALF, K(d,b)=min(b, max(−b,d)) is the clipping function, and k(i,j) are clipping parameters, which depends on filter coefficient at the (i,j). The encoder performs the optimization to find the best k(i,j).

In the implementation according to JVET-M0385, the clipping parameters k(i,j) are specified for each ALF filter, where one clipping value is signaled per filter coefficient. It means that 12 clipping values are signaled in the bitstream per Luma filter and 6 clipping values for the Chroma filter.

In order to limit the signaling cost and the encoder complexity, the clipping values are limited to a small set of possible values in JVET-M0385. Furthermore, only use 4 possible values are used for Inter slices and 3 possible values are used for Intra slices.

Because the variance of the local differences is often higher for Luma than for Chroma, two different sets are used for the Luma and Chroma filters. Furthermore, the maximum sample value is included in each set, so that clipping can be disabled if it is not necessary.

The proposed sets of clipping values according to JVET-M0385 are provided in Table 1.

TABLE 1

| | Allowed clipping values | |
|---|---|---|
| | INTRA | INTER |
| LUMA | {10, 102, 1024} | {6, 32, 181, 1024} |
| CHROMA | {4, 24, 1024} | {4, 25, 161, 1024} |

The clipping values are encoded in the slice header using a Golomb encoding corresponding to the index of the clipping value in the set.

Reduced Buffer Requirement for ALF Using Virtual Boundary

In JVET-M0301 ((A. Kotra, et al., "*Non-CE: Loop filter line buffer reduction*", in Joint Video Exploration Team (JVET) of ITU-T SG 16 WP 3 and ISO/IEC JTC 1/SC 29/WG 11, 13th Meeting: Marrakech, Mass., 9-18 Jan. 2019, Document: JVET-M0301), a mechanism of reducing the line buffer requirement of ALF (adaptive loop filter) is disclosed. The contribution uses the concept of virtual boundaries (VBs) which are upward shifted horizontal CTU boundaries by "N" samples. Modified ALF block classification and modified ALF filtering are applied for the samples which are near the virtual boundary to reduce the number of line buffers required. Modified ALF block classification only uses the samples that are above the VB to classify the given 4×4 block, which is above VB. Similarly, for the classification of the 4×4 block below VB, samples belonging to the lines below the VB are used. Modified ALF filtering uses a combination of conditional disabling and truncated versions of the original ALF filter.

Truncated ALF Filtering at Virtual Boundaries

Truncated version of the filters are used for filtering of the Luma samples belonging to the lines close to the virtual boundaries. These truncated versions of the filters can be used for both N=4 and N=6 cases. Similarly, truncated version of the filters are also used for chroma ALF filtering.

For the truncated ALF, the coefficients have to be normalized, i.e., the sum of remaining coefficients have to be the same as the sum of original coefficients. FIGS. 4A-4F illustrate examples of coefficient normalization for truncated luma ALF filter processing at the virtual boundary. FIG. 4A illustrates the modified ALF coefficient for the case that the top pixel (i.e., pixel c0) is outside the virtual boundary. Coefficient c2 is modified to c2', where c2'=c2+c0. FIG. 4B illustrates the case that the bottom pixel (i.e., c0) is outside the virtual boundary. FIG. 4C illustrates the modified ALF coefficient for the case that the top two rows (i.e., pixels c0, c1, c2 and c3) are outside the virtual boundary. Therefore, coefficient c5, c6 and c7 are modified to c5', c6' and c7', where c5'=c5+c1, c6'=c6+c2+c0, and c7'=c7+c3. FIG. 4D illustrates the modified ALF coefficient for the case that the bottom two rows (i.e., pixels c0, c1, c2 and c3) are outside the virtual boundary. FIG. 4E illustrates the modified ALF coefficient for the case that the top three rows (i.e., pixels c0 through c8) are outside the virtual boundary. Therefore, coefficient c10, c11 and c12 are modified to c10', c11' and c12', where c0'=c10+c4+c8, c11'=c11+c5+c7+c1+c3 and c12'=c12+2*c6+2*c2+2*c0. FIG. 4F illustrates the modified ALF coefficient for the case that the bottom three rows (i.e., pixels c0 through c8) are outside the virtual boundary.

FIGS. 5A-5D illustrates examples of truncated chroma ALF filter processing at the virtual boundary. FIG. 5A illustrates the modified ALF coefficient for the case that the top pixel (i.e., pixel c0) is outside the virtual boundary. Coefficient c2 is modified to c2', where c2'=c2+c0. FIG. 5B illustrates the case that the bottom pixel (i.e., c0) is outside the virtual boundary. FIG. 5C illustrates the modified ALF coefficient for the case that the top two rows (i.e., pixels c0, c1, c2 and c3) are outside the virtual boundary. Therefore, coefficient c5 and c6 are modified to c5' and c6', where c5'=c5+c1+c3 and c6'=c6+2*c2+2*c0. FIG. 5D illustrates the modified ALF coefficient for the case that the bottom two rows (i.e., pixels c0, c1, c2 and c3) are outside the virtual boundary.

Virtual Boundary at Slice/Brick/Tile Boundary and 360 Video Virtual Boundary

In JVET-O0016 (M. Zou, et al., "JVET AHG report: Implementation studies (AHG16)", in Joint Video Exploration Team (JVET) of ITU-T SG 16 WP 3 and ISO/IEC JTC 1/SC 29/WG 11, 15th Meeting: Gothenburg, SE, 3-12 Jul. 2019, Document: JVET-O0016), an ALF line buffer issue along slice/brick/tile boundary and 360 video virtual boundary is reported. The 360 video is also referred as 360-degree video or 360-degree VR (virtual reality) video. The ALF virtual boundary was adopted to remove the ALF line buffer requirement, where the virtual boundary is located at 4 luma lines above the bottom CTU boundary except for the CTUs at the last CTU row of a picture. In the draft specification text according to VVC Test Model 6 (VTM6), the ALF virtual boundary is not present for a CTU if its bottom CTU boundary is also a slice/brick/tile boundary (with the loop-filter across those boundaries being disabled) or a 360 video virtual boundary. For the 360 video, a 360 picture may contain one or more "virtual boundaries" corresponding to discontinuous edges between faces. Since the ALF virtual boundary is disabled according to the current VVC specification, it has the following consequences:

For decoders, not knowing the slice/brick/tile boundaries upfront (i.e. low-delay applications) implies that the ALF line buffer needs to be restored. To process the ALF filtering of the bottom lines of the current CTU (e.g. luma lines 5, 6 and 7 above the bottom CTU boundary), the decoders need to know whether the current bottom CTU boundary coincides with other types of boundaries. This information, however, is unknown until the next slice/brick/tile is decoded.

Even if the slice/brick/tile boundaries are known upfront (e.g. the CABAC decoding is fully decoupled at frame level), the decoders need to run the loop-filters (deblocking, SAO and ALF) at a speed of 68 lines per 64×64 VDPU (Video Decoder Processing Unit?) all the time (an overprovision of roughly 6%) in order to avoid using the ALF line buffer.

In JVET-O0625 (H. Liu, et al., "Non-CE5: Padding method for samples at variant boundaries in ALF", in Joint Video Exploration Team (JVET) of ITU-T SG 16 WP 3 and ISO/IEC JTC 1/SC 29/WG 11, 15th Meeting: Gothenburg, SE, 3-12 Jul. 2019, Document: JVET-O0016), two methods are proposed to solve the above issue:

1. ALF virtual boundary is applicable to CUs with the bottom boundary being a slice/brick/virtual boundary regardless of the usage of samples across boundaries.

2. In the symmetric 2-side padding method, when a sample is at two boundaries, e.g., one boundary in the above side and one boundary in the below side, the number of samples to be padded is determined according to the nearer boundary as shown in FIGS. 6A-6B. Meanwhile, when deriving the classification information, only the 4 lines between the above and below boundaries in FIGS. 6A-B are used. FIG. 6A illustrates the example that three rows are below the slice/brick/virtual boundary or the 360-degree virtual boundary (610) for the current sample (i.e., c12) to be filtered. The symmetric padding will pad the three rows below the slice/brick/virtual boundary or the 360-degree virtual boundary (610) and the three corresponding rows above, where the padded samples are shown in boxed filled with slant lines. FIG. 6B illustrates the example that two rows are below the slice/brick/virtual boundary or the 360-degree virtual boundary (610) for the current sample (i.e., c12) to be filtered. The symmetric padding will pad the two rows below the slice/brick/virtual boundary or the 360-degree virtual boundary (620) and the two corresponding rows above, where the padded samples are shown in boxed filled with slant lines.

In this application, various other ALF boundary issues are addressed and solutions to improve performance, to unify multiple systems or to simply ALF boundary process are disclosed.

BRIEF SUMMARY OF THE INVENTION

Methods and apparatus for loop-filter processing of reconstructed video are disclosed. According to this method, reconstructed pixels are received. A target loop filter is applied to the reconstructed samples, where if a loop-filter is disallowed for a target boundary, the target loop filter is disabled at top, bottom, left and right of the target boundary. Filtered reconstructed samples are provided for video decoding output or for further video encoding or decoding process.

In one embodiment, the target loop filter corresponds to deblocking filter. In another embodiment, the target loop filter corresponds to adaptive loop filter, sample adaptive offset or a combination of both.

In one embodiment, the target boundary corresponds to a slice boundary, a tile boundary or both. In another embodiment, the target boundary corresponds to a tile boundary, a picture boundary, or a 360 virtual boundary.

In another method, reconstructed chroma samples and related reconstructed luma samples in a colour picture are received. First ALF (Adaptive Loop Filter) is applied to the reconstructed chroma samples for a target reconstructed chroma sample to generate a first filtered chroma sample. Second ALF is applied to the related reconstructed luma samples to generate a second filtered chroma sample for the target reconstructed chroma sample, wherein a virtual boundary is determined and one set of the related reconstructed luma samples are located on an other side of the virtual boundary from the corresponding target reconstructed chroma sample, said one set of the related reconstructed luma samples are excluded from inputs to the second ALF processing. A final filtered chroma sample is generated by combining the first filtered chroma sample and the second filtered chroma sample, where the final filtered chroma sample is used as a video decoding output or used for further video encoding or decoding process.

In one embodiment, the second ALF is configured to exclude the inputs corresponding to one or more symmetric related reconstructed luma samples located at symmetric positions of said one set of the related reconstructed luma samples. In another embodiment, the second ALF corresponds to a truncated symmetric filter without the inputs said one set of the related reconstructed luma samples. In another embodiment, a modified filter shape of the second ALF is provided, wherein the modified filter shape is modified from a default filter shape.

According to yet another method, reconstructed chroma samples and related reconstructed luma samples in a colour picture are received. Luma ALF is applied to the related reconstructed luma samples to generate a filtered luma sample. First ALF is applied to the related reconstructed luma samples to generate a first filtered chroma sample for a target reconstructed chroma sample, wherein if loop-filter processing across a target boundary is disabled, corresponding related reconstructed luma samples are generated for said first ALF generates in a same way as for said luma ALF processing, and the first filtered chroma sample then is combined with a second filtered chroma sample derived based on the reconstructed chroma samples to form a final filtered chroma sample. The final filtered chroma sample and the filtered luma sample are used as a video decoding output or used for further video encoding or decoding process.

In one embodiment, the target boundary corresponds to a slice boundary, a tile boundary, a brick boundary or a picture. In another embodiment, the target boundary corresponds to a 360 virtual boundary.

In one embodiment, if one or more corresponding related reconstructed luma samples are unavailable, both said first ALF and said luma ALF use repetitive padding to generate said one or more corresponding related reconstructed luma samples. In another embodiment, if one or more corresponding related reconstructed luma samples are unavailable, both said first ALF and said luma ALF are disabled. Said one or more corresponding related reconstructed luma samples are unavailable when these corresponding related reconstructed luma samples are outside the boundary. In yet another embodiment, both said first ALF and said luma ALF generate the corresponding related reconstructed luma samples according to an ALF virtual boundary process, wherein one or more corresponding related reconstructed luma samples and one or more symmetric related reconstructed luma samples at symmetric positions of said one or more corresponding related reconstructed luma samples are excluded from said first ALF and said luma ALF.

BRIEF DESCRIPTION OF THE DRAWINGS

FIG. 4A illustrates the modified ALF coefficient for the case that the top pixel is outside the virtual boundary; FIG. 4B illustrates the case that the bottom pixel is outside the virtual boundary; FIG. 4C illustrates the modified ALF coefficient for the case that the top two rows are outside the virtual boundary; FIG. 4D illustrates the modified ALF coefficient for the case that the bottom two rows are outside the virtual boundary; FIG. 4E illustrates the modified ALF coefficient for the case that the top three rows are outside the virtual boundary; and FIG. 4F illustrates the modified ALF coefficient for the case that the bottom three rows are outside the virtual boundary.

FIG. 5A illustrates the modified ALF coefficient for the case that the top pixel is outside the virtual boundary; FIG. 5B illustrates the case that the bottom pixel is outside the virtual boundary; FIG. 5C illustrates the modified ALF coefficient for the case that the top two rows are outside the virtual boundary; and FIG. 5D illustrates the modified ALF coefficient for the case that the bottom two rows are outside the virtual boundary.

FIG. 6A illustrates the example that three rows are below the slice/brick/virtual boundary or the 360-degree virtual boundary; and FIG. 6B illustrates the example that two rows are below the slice/brick/virtual boundary or the 360-degree virtual boundary.

DETAILED DESCRIPTION OF THE INVENTION

Figure 1A:
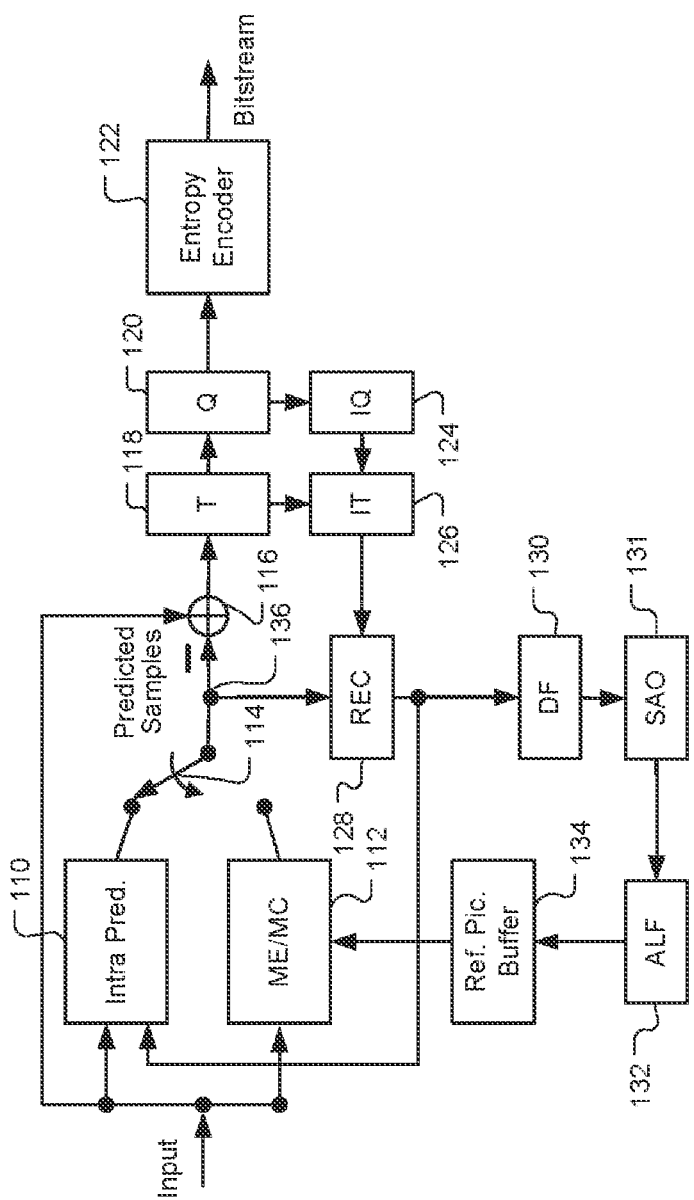
FIG. 1A illustrates an exemplary adaptive inter/intra video encoding system incorporating DF, SAO and ALF in-loop processing.
Figure 1B:
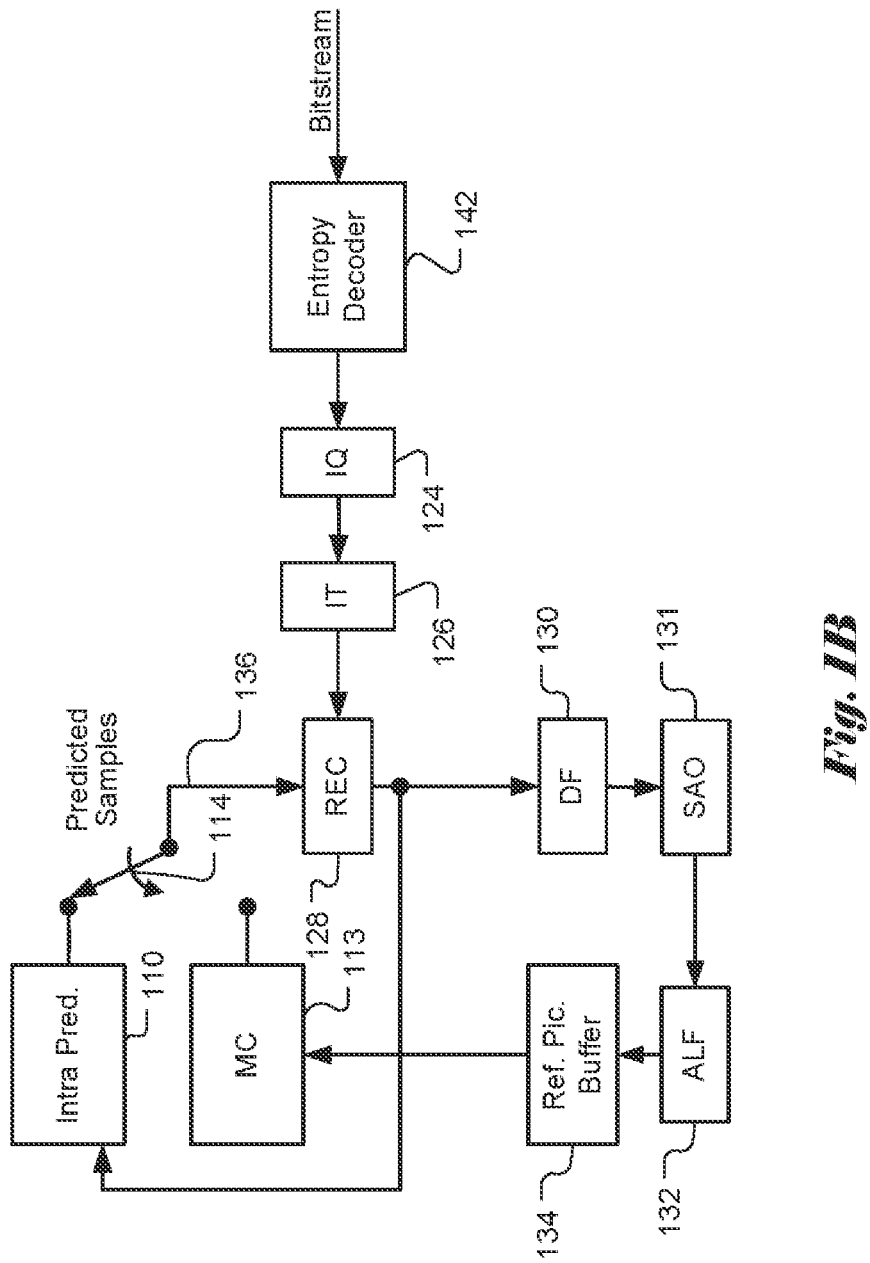
FIG. 1B illustrates an exemplary adaptive inter/intra video decoding system incorporating DF, SAO and ALF in-loop processing.

The following description is of the best-contemplated mode of carrying out the invention. This description is made for the purpose of illustrating the general principles of the invention and should not be taken in a limiting sense. The scope of the invention is best determined by reference to the appended claims.

Method 1: Disable ALF when the Loop-Filter Across Boundaries is Disabled

In order to apply the first method of JVET-O0625 and enhance the usage of samples across boundaries (i.e., the loop-filter across those boundaries being disabled), several methods are proposed. In one embodiment, ALF is disabled for the last 4×4 blocks row in a slice or brick when the loop-filter across those boundaries is disallowed. In another embodiment, this concept is extended to handle the vertical boundaries, which can be a vertical boundary of slice/brick/tile/picture. In another embodiment, the top and bottom 4×4 block rows in a slice/brick/tile are not filtered by ALF when the loop-filter across those boundaries is disallowed. In another embodiment, the leftmost and rightmost 4×4 blocks columns in a slice/brick/tile are also not filtered by ALF when the loop-filter across those boundaries is disallowed. In another embodiment, the top and bottom 4×4 blocks rows in a picture are not filtered by ALF. In another embodiment, the leftmost and rightmost 4×4 blocks rows in a picture are not filtered by ALF.

In one embodiment, when a loop-filter across those boundaries is disabled, different in-loop filtering processes are disabled for those boundaries with the in-loop filtering process disabled. For example, when the loop-filter across those boundaries for one slice is disabled, then only top and left slice boundaries are not filtered by deblocking filter (DF) and sample adaptive offset (SAO). Accordingly, ALF is also not applied at top and left slice boundaries. In another example, when the loop-filter across those boundaries for one slice is disabled, then all slice boundaries, including top, left, right, and bottom boundaries are not filtered by deblocking filter and sample adaptive offset. Accordingly, ALF is also not applied at all slice boundaries.

In another embodiment, the proposed method can be applied to 360 virtual boundaries. For some 360 virtual boundaries, the neighboring samples in one picture represented in a 2D spatial domain (e.g., neighboring samples across a discontinuous boundary between two faces) are not really the neighboring samples (i.e., non-spatially adjacent) in the 3D space domain. Therefore, the neighboring samples should not be used for the filtering process. In this case, ALF can be disabled to avoid using the wrong neighboring samples. The 360 virtual boundaries can be horizontal or vertical boundaries. Accordingly, if it is a horizontal boundary, two 4×4 block rows corresponding to the 4×4 block rows above and below this boundary respectively are not filtered by ALF. If it is vertical boundary, then two 4×4 block columns closest to this boundary are not filtered by ALF.

The 4×4 block mentioned in the above can be an M×N block in the ALF process, where M and N can be any integers.

Method 2: Simplified CC-ALF as Multiple Inputs ALF

In CC-ALF, one additional filter is added for the chroma component and the filtered output will be the weighted sum of the original chroma filter output and the additional filter output. In one embodiment, only one additional filter tap with the input from the corresponding luma sample is added to the original chroma filter instead of one additional filter with the inputs from the corresponding luma samples. In another embodiment, a non-linear clipping operation can also be applied to this filter tap. In one embodiment, a clipping index can be signaled for this filter tap. In another embodiment, a non-linear clipping operation cannot be applied to this filter tap. Therefore, the clipping index does not need to be signaled for this filter tap.

In one embodiment, one flag is signaled in ALF filter parameters to indicate whether this filter tap is used or not. The corresponding luma sample is decided according to the chroma format. For example, if the video format is YUV444, the corresponding luma sample is the same spatial position of to-be-processed chroma sample. If the video format is YUV422 or YUV420, then the corresponding luma sample can be the predefined spatial position among the corresponding luma samples of the to-be-processed chroma sample. For example, for YUV420, there are four corresponding luma samples for one chroma sample. The input of the additional filter tap from the luma component for the chroma component can be one of these four samples. The selection can be predefined in the video coding standard. In another embodiment, the corresponding luma sample is the weighted sum of all corresponding luma samples. For example, the averaging value of these four luma samples for YUV420, the average value of the two left luma samples for YUV420, or the average value of the two luma samples for YUV422.

In another embodiment, the precision of filter coefficients in the additional filter in CC-ALF is aligned with the original design.

In another embodiment, the proposed method is applied to luma ALF. Accordingly, two additional filter taps with the input from the chroma are added for the luma ALF. In one embodiment, only one additional filter tap is added for the luma ALF and the input of the additional filter tap is the weighted sum of chroma components.

Method 3: CC-ALF with Virtual Boundary Process

Figure 2A:
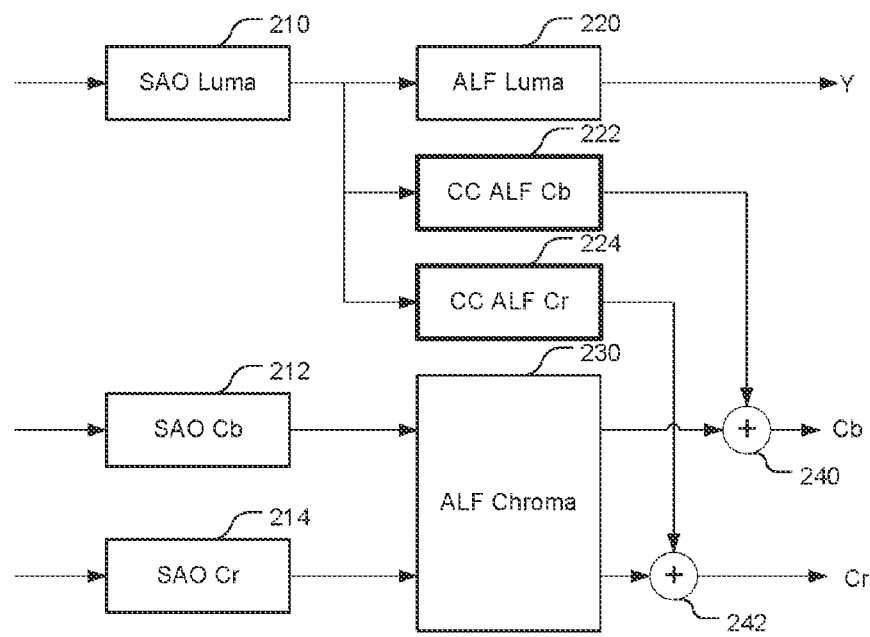
FIG. 2A illustrates the structure of CC-ALF with respect to the other loop filters according to JVET-O0636 where the ALF processing is performed after respective SAO.
Figure 2B:
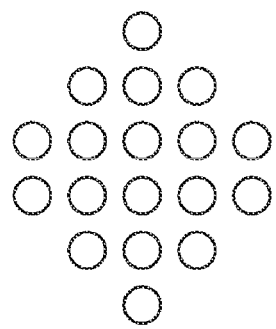
FIG. 2B illustrates the diamond shaped filter applied to the luma channel for each chroma component according to JVET-O0636.
Figure 3:
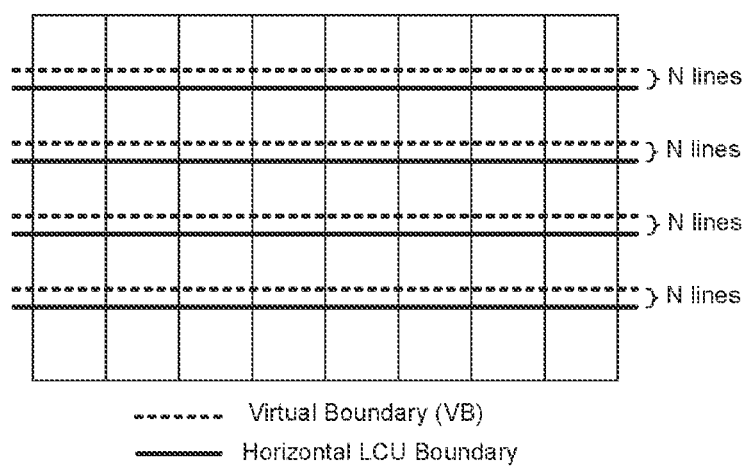
FIG. 3 illustrates an example of VBs by upward shifting horizontal LCU boundaries by N pixels.
Figure 4A:
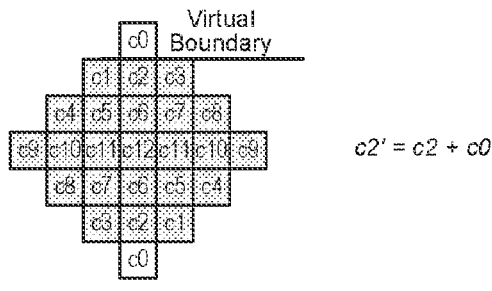
FIGS. 4A-4F illustrate examples of coefficient normalization for truncated luma ALF filter processing at the virtual boundary, where
Figure 4B:
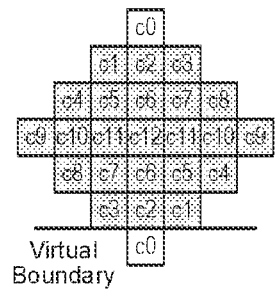
Figure 4C:
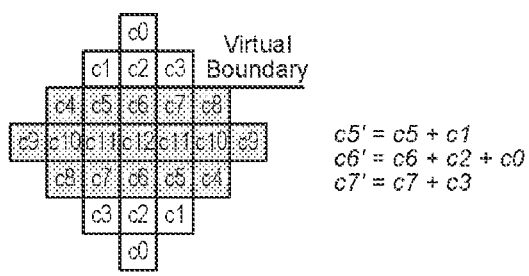
Figure 4D:
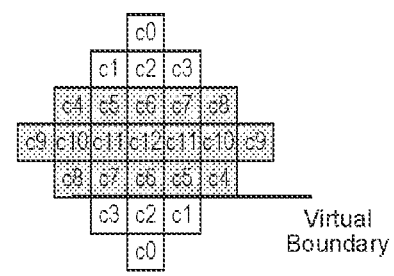
Figure 4E:
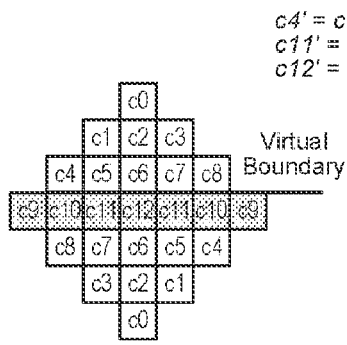
Figure 4F:
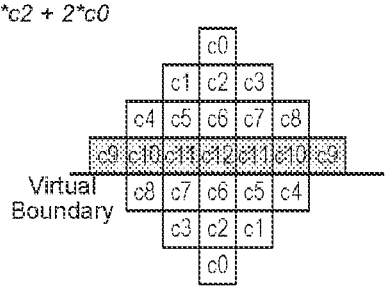
Figure 5A:
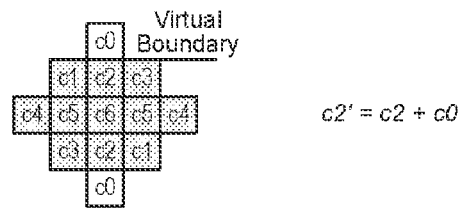
FIGS. 5A-5D illustrates examples of truncated chroma ALF filter processing at the virtual boundary, where
Figure 5B:
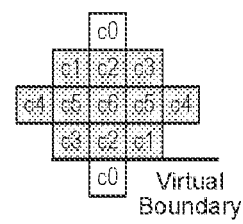
Figure 5C:
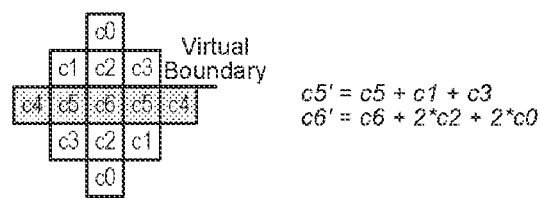
Figure 5D:
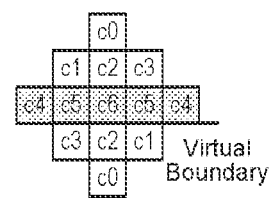
Figure 6A:
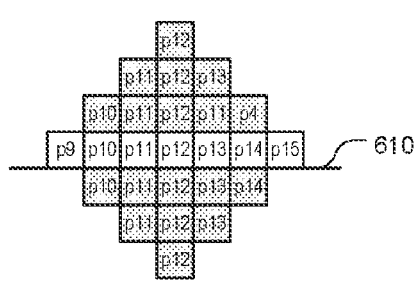
FIGS. 6A-6B illustrates examples of the symmetric 2-side padding method, where
Figure 6B:
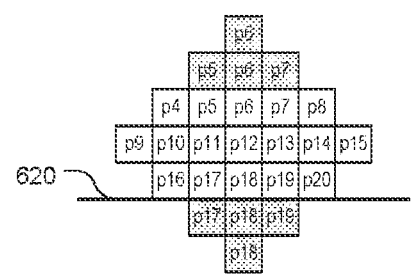

In ALF, in order to remove the line buffer requirement, the virtual boundary is introduced. The position of virtual boundaries is 4 luma lines above CTU row boundaries and two chroma lines above CTU row boundaries. When CC-ALF is applied, it should avoid using the luma samples across the virtual boundaries. For example, in the original design, a 5×6 diamond filter, as shown in FIG. 2B, is used to derive the cross-colour filtered signal for the chroma component. The 5×6 diamond filter in this example can be considered as a default filter shape. While the 5×6 diamond filter is used as an example of CC-ALF, the present invention is not limited to this particular filter shape. If the neighboring luma samples of the corresponding luma sample in the filter footprint are located in the other side of virtual boundaries, the filtering process or filter shape should be changed to avoid using the samples located in the other side of the virtual boundary. In one embodiment, the filter shape is reduced to a 5×4 diamond filter when only one luma row is located in the other side of the virtual boundary. In other words, one luma row on the other side of the virtual boundary and one luma row located at corresponding symmetric positions of the CC-ALF are excluded for the filtering process. If there are two luma rows located in the other side of the virtual boundary, then the filter shape is reduced to a 5×2 diamond filter. In other words, two luma rows on the other side of the virtual boundary and two luma rows located at corresponding symmetric positions of the CC-ALF are excluded for the filtering process. In another embodiment, padding technology is used to generate the samples located in the other side of the virtual boundary instead of changing the filter shape. The padding technology can be repetitive pattern, even symmetric pattern, odd symmetric pattern, or the method used in ALF virtual boundary process. In another embodiment, CC-ALF is disabled when there is at least one luma sample located in the other side of the virtual boundary.

Method 4: CC-ALF with Slice/Brick/Tile/Picture/360 Boundary Process

At slice/brick/tile boundaries, when the loop-filter across those boundaries is disabled, the process used to generate corresponding luma samples in CC-ALF should be the same as the process used to generate corresponding luma samples in luma ALF. In one embodiment, when the loop-filter across (outside) slice/brick/tile boundaries is disabled, ALF with VB (virtual boundary) is used to generate the corresponding luma samples in luma ALF. Accordingly, ALF with VB is used to generate the corresponding luma samples in CC-ALF. In one embodiment, when the loop-filter across slice/brick/tile boundaries is disabled, luma ALF is disabled for those samples if luma ALF need unavailable samples which are outside the boundary. Accordingly, CC-ALF is also disabled for those corresponding chroma samples. In one embodiment, when the loop-filter across slice/brick/tile boundaries is disabled, repetitive padding is used to generate the corresponding luma samples in luma ALF. Accordingly, repetitive padding is also used to generate the corresponding luma samples in CC-ALF. In other words, padding is applied to replace the corresponding luma samples outside the boundaries in luma ALF and CC-ALF. The replaced corresponding luma samples are unavailable samples. The proposed method also can be applied at picture boundaries or 360 virtual boundary.

Any of the foregoing proposed methods can be implemented in encoders and/or decoders. For example, any of the proposed methods can be implemented in an in-loop filtering module of an encoder and/or a decoder. Alternatively, any of the proposed methods can be implemented as a circuit coupled to in-loop filtering module of the encoder and/or the decoder.

Figure 7:
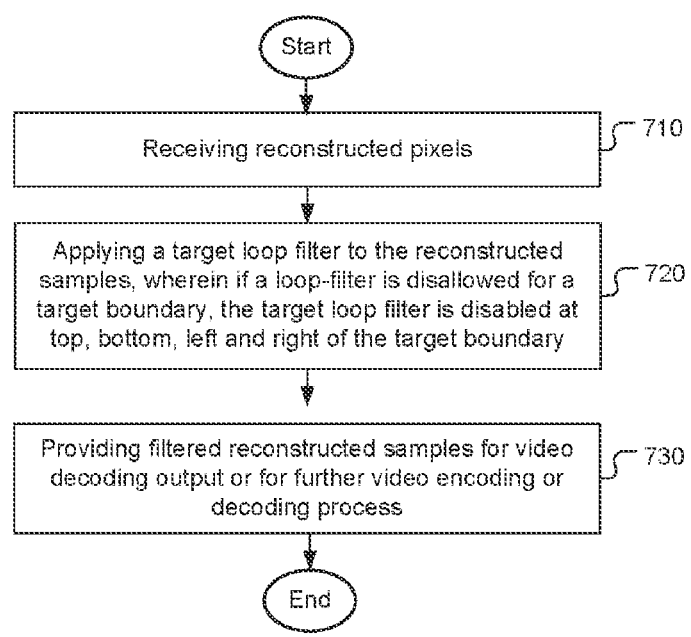
FIG. 7 illustrates a flowchart of an exemplary loop filtering processing of reconstructed video according to an embodiment of the present invention, where if a loop-filter is disallowed for a target boundary, the target loop filter is disabled at top, bottom, left and right of the target boundary.

FIG. 7 illustrates a flowchart of an exemplary loop filtering processing of reconstructed video according to an embodiment of the present invention, where if a loop-filter is disallowed for a target boundary, the target loop filter is disabled at top, bottom, left and right of the target boundary. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, reconstructed pixels are received in step 710. A target loop filter is applied to the reconstructed samples in step 720, wherein if a loop-filter is disallowed for a target boundary, the target loop filter is disabled at top, bottom, left and right of the target boundary. Filtered reconstructed samples are then provided for video decoding output or for further video encoding or decoding process in step 730.

Figure 8:
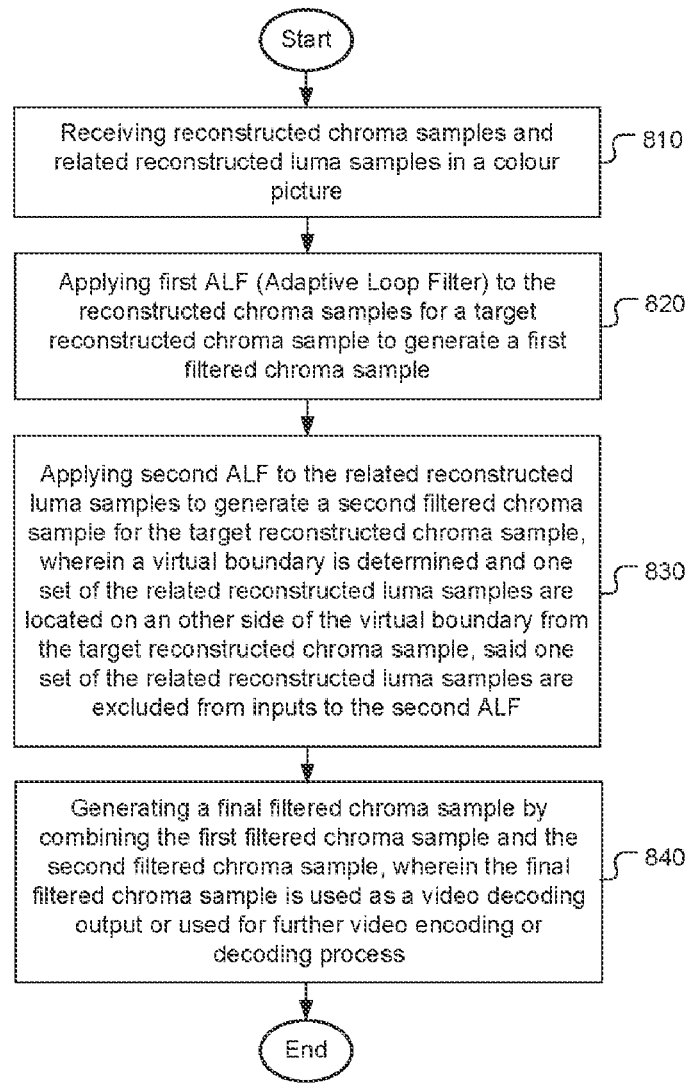
FIG. 8 illustrates a flowchart of an exemplary ALF processing of reconstructed video according to an embodiment of the present invention, where CC-ALF shape is changed across a virtual boundary.

FIG. 8 illustrates a flowchart of an exemplary ALF of reconstructed video according to an embodiment of the present invention, where CC-ALF shape is changed across a virtual boundary. According to this method, reconstructed chroma samples and related reconstructed luma samples in a colour picture are received in step 810. First ALF is applied to the reconstructed chroma samples for a target reconstructed chroma sample to generate a first filtered chroma sample in step 820. Second ALF is applied to the related reconstructed luma samples to generate a second filtered chroma sample for the target reconstructed chroma sample in step 820, wherein a virtual boundary is determined and one set of the related reconstructed luma samples are located on an other side of the virtual boundary from the target reconstructed chroma sample, said one set of the related reconstructed luma samples are excluded from inputs to the second ALF. A final filtered chroma sample is generated by combining the first filtered chroma sample and the second filtered chroma sample in step 840, wherein the final filtered chroma sample is used as a video decoding output or used for further video encoding or decoding process.

Figure 9:
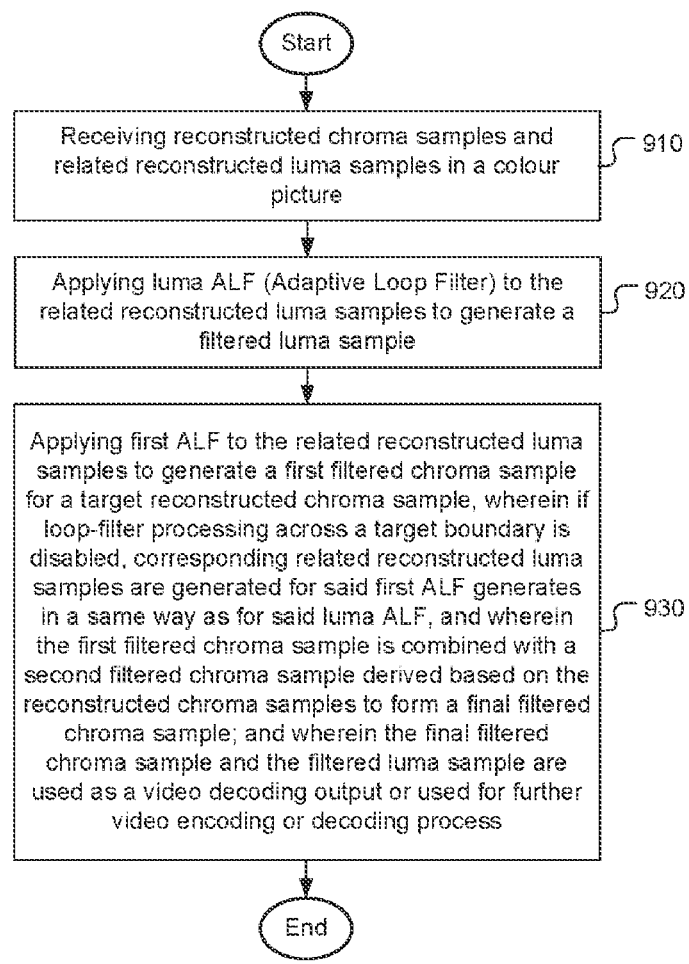
FIG. 9 illustrates a flowchart of an exemplary ALF processing of reconstructed video according to an embodiment of the present invention, where CC-ALF and luma ALF handle unavailable samples in a same way.

FIG. 9 illustrates a flowchart of an exemplary ALF of reconstructed video according to an embodiment of the present invention, where CC-ALF and luma ALF handle unavailable samples in a same way. According to this method, reconstructed chroma samples and related reconstructed luma samples in a colour picture are received in step 910. Luma ALF is applied to the related reconstructed luma samples to generate a filtered luma sample in step 920. First ALF is applied to the related reconstructed luma samples to generate a first filtered chroma sample for a target reconstructed chroma sample in step 930, wherein if loop-filter processing across a target boundary is disabled, corresponding related reconstructed luma samples are generated for said first ALF generates in a same way as for said luma ALF, wherein the first filtered chroma sample is combined with a second filtered chroma sample derived based on the reconstructed chroma samples to form a final filtered chroma sample; and wherein the final filtered chroma sample and the filtered luma sample are used as a video decoding output or used for further video encoding or decoding process. It is to be noted that, said unavailable samples are the related reconstructed luma samples outside the target boundary.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video coding, the method comprising:
receiving reconstructed chroma samples and related reconstructed luma samples in a colour picture;
applying first ALF (Adaptive Loop Filter) to the reconstructed chroma samples for a target reconstructed chroma sample to generate a first filtered chroma sample;
applying second ALF to the related reconstructed luma samples to generate a second filtered chroma sample for the target reconstructed chroma sample, wherein a virtual boundary is determined and one set of the related reconstructed luma samples are located on an other side of the virtual boundary from the target reconstructed chroma sample, said one set of the related reconstructed luma samples are excluded from inputs to the second ALF; and
generating a final filtered chroma sample by combining the first filtered chroma sample and the second filtered chroma sample, wherein the final filtered chroma sample is used as a video decoding output or used for further video encoding or decoding process.

2. The method of claim 1, wherein the second ALF is configured to exclude the inputs corresponding to one or more symmetric related reconstructed luma samples located at symmetric positions of said one set of the related reconstructed luma samples.

3. The method of claim 1, wherein the second ALF corresponds to a truncated symmetric filter without the inputs corresponding to said one set of the related reconstructed luma samples.

4. The method of claim 1, wherein a modified filter shape of the second ALF is provided, wherein the modified filter shape is modified from a default filter shape.

5. A method for video coding, the method comprising:
receiving reconstructed chroma samples and related reconstructed luma samples in a colour picture;
applying luma ALF (Adaptive Loop Filter) to the related reconstructed luma samples to generate a filtered luma sample;
applying first ALF to the related reconstructed luma samples to generate a first filtered chroma sample for a target reconstructed chroma sample, wherein if loop-filter processing across a target boundary is disabled, corresponding related reconstructed luma samples are generated for said first ALF generates in a same way as for said luma ALF, and wherein the first filtered chroma sample is combined with a second filtered chroma sample derived based on the reconstructed chroma samples to form a final filtered chroma sample; and
wherein the final filtered chroma sample and the filtered luma sample are used as a video decoding output or used for further video encoding or decoding process.

6. The method of claim 5, wherein the target boundary corresponds to a slice boundary, a tile boundary, a brick boundary or a picture.

7. The method of claim 5, wherein if one or more corresponding related reconstructed luma samples are unavailable, both said first ALF and said luma ALF apply repetitive padding to generate said one or more corresponding related reconstructed luma samples.

8. The method of claim 5, wherein if one or more corresponding related reconstructed luma samples are unavailable, both said first ALF and said luma ALF are disabled.

9. The method of claim 5, wherein both said first ALF and said luma ALF generate the corresponding related reconstructed luma samples according to an ALF virtual boundary process, wherein one or more corresponding related reconstructed luma samples and one or more symmetric related reconstructed luma samples at symmetric positions of said one or more corresponding related reconstructed luma samples are excluded from said first ALF and said luma ALF.

* * * * *